Patented Sept. 16, 1924.

1,508,483

UNITED STATES PATENT OFFICE.

JOHN H. STEVENS, OF SOUTH ORANGE, NEW JERSEY, ASSIGNOR TO THE CELLULOID COMPANY, A CORPORATION OF NEW JERSEY.

PYROXYLINE COMPOSITION AND PROCESS.

No Drawing. Application filed October 1, 1921. Serial No. 504,742.

*To all whom it may concern:*

Be it known that I, JOHN H. STEVENS, a citizen of the United States, residing at South Orange, in the county of Essex and State of New Jersey, have invented certain new and useful Improvements in Pyroxyline Compositions and Processes, of which the following is a specification.

This invention relates to certain new and useful improvements in the manufacture of compositions of pyroxyline or nitrocellulose, and its object is to produce a pyroxyline compound in which a suitable substitute for camphor is employed.

I have discovered that a suitable substitute for camphor in such compounds is chloral intermixed with a relatively small proportion of camphor as a modifier. In other words sufficient camphor is intermixed with the large proportion of chloral to impart to the chloral sufficient solvent power and immiscibility with water.

In carrying out the invention I preferably employ the methods commonly employed for pyroxyline plastics adaptable to the manufacture of sheets for fabrication into combs, brushes, mirrors, trays, and other articles, and also combine with the chloral-camphor solvent the solvents hereinafter mentioned.

Preferably I first grind the camphor with the hydrated pyroxyline, and then add the chloral to the dried cake or pulp at the time of introducing the usual liquid solvents or menstrua necessary or convenient for making a combination for easy manipulation, on rolls for example. Both of the solids may however be ground with the hydrated pyroxyline at the same time if desired and the water then removed. Suitable pigments or other coloring matters can be added in the customary manner, that is, either by grinding them by simple admixture or with the pulp or introducing them in solution at the rolls or mixers, as is well understood. Pressing the rolled product into blocks, planing the blocks into sheets, and drying and finishing the sheets for the market or further use is done in the usual way.

By chloral I mean the hydrate or alcoholate or any equivalent thereof, but my preference is for chloral alcoholate, which I have discovered possesses qualities quite superior to those of chloral hydrate or other chlorals of commerce. The use of the alcoholate results in compounds which are more readily manipulated and appreciably stronger. Nevertheless, the hydrate, when used according to my proportions, is also capable of furnishing products of a surely fine character when compared with the uncertain and variable chloral compounds previously made.

As examples of compositions and proportions, I give the following:

For a hard material to be cut, bent, sawed or moderately flowed under heat, I use as the original mixture:

| | |
|---|---|
| Pyroxyline | 100 pts. by weight. |
| Camphor | 5 pts. |
| Chloral alcoholate | 15 to 20 pts. |
| Amyl acetate | 10 pts. |
| Alcohol | 25 pts. |
| Pure acetone | 35 pts. |
| Color | As desired. |

The higher chloral proportion makes a material which can be more readily manipulated but one that is still of peculiar use for hard purposes.

For a compound which is to be moldable when dry, I employ:

| | |
|---|---|
| Pyroxyline | 100 pts. |
| Camphor | 10 pts. |
| Chloral alcoholate | 15 to 20 pts. |
| Amyl acetate | 10 pts. |
| Alcohol | 25 pts. |
| Pure acetone | 35 pts. |
| Color | As desired. |

The higher chloral proportion makes for increased plasticity.

For a tough or flexible sheeting, I use:

| | |
|---|---|
| Pyroxyline | 100 pts. |
| Camphor | 10 pts. |
| Chloral alcoholate | 30 pts. |
| Amyl acetate | 10 pts. |
| Alcohol | 25 pts. |
| Pure acetone | 35 pts. |
| Color | As desired. |

In place of amyl acetate, I can use any of its trade equivalents, for example, butyl acetate. In all cases the amyl, or its equivalent acetate, is to remain fairly constant, but the acetone and alcohol can be more or less, provided the relative proportion of 35—25 is maintained. In place of pure acetone a methyl acetone freed from aldehydes and other impurities can be substituted.

The camphor substitute above described imparts solidity and strength to the resultant pyroxyline compounds and the compounds are impervious to moisture. In addition to this, the chloral-camphor-pyroxyline combinations, when made according to my specifications, are free from objectionable odor of chloral and are non-toxic. They are also well within the limits of rigidity set by practical use. In short the said substitute possesses all of the characteristics of camphor in respect to the workability of the mixtures and the resultant product, especially in respect to the homogeneous, strong and non-brittle character of the product.

I have found very desirable results produced by employing ethyl acetate as a converting agent in conjunction with the chloral-camphor solvent. If instead of employing the ordinary ethyl acetate of commerce, I employ pure, or so-called 99% ethyl acetate, the final compound will have no after odor of ethyl acetate. I therefore recommend as a formula superior to those already given the plentiful substitution of pure ethyl acetate for the amyl acetate in such formulas. I have had complete success with the following:

| | |
|---|---|
| Pyroxline | 100 parts. |
| Camphor | 5 parts. |
| Chloral alcoholate | 15 to 20 pts. |
| Pure ethyl acetate | 25 pts. |
| Alcohol | 35 pts. |
| Pure acetone | 12 pts. |
| Color | As desired. |

This is for a hard, practically nonplastic, sheeting. The proportion of ethyl acetate may be varied to suit different manufacturing conditions. However, it is found that, unlike amyl acetate, the proportion of the ethyl acetate which remains in the final dried product is fairly constant. For a plastic or moldable sheet I use 5 parts more of the camphor and the larger proportion of chloral, namely, 20. For a still more plastic or tougher sheet I add 5 parts of the amyl acetate. The acetone can be increased or diminished according to the consistency desired in the original mixture, that is, whether it is to be softer or stiffer.

By the use of the pure ethyl acetate I produce a strong final sheet which is practically inodorous and of the best quality demanded by users of pyroxline plastics. This is especially suitable for boxes or other articles which, while remaining closed, accumulate odors emitted by the pyroxyline material of which the walls are formed.

If desired, synthetic camphor may be employed in place of the natural substance.

I have found that the soluble pyroxylines commonly employed for plastics, though satisfactory for compounds in which camphor is freely used, are nevertheless prone to exhibit variations of workability and final structure according to their degree of affinity for the chloral-camphor solvent. I have discovered that pyroxyline having a nitrogen content between 10.2 and 10.7 per cent is especially advantageous.

I therefore recommend as peculiarly capable of giving the best workability, solidity and strength the employment of this particular pyroxyline in association with my chloral-camphor solvent. As for the usual soluble pyroxylines which form the basis for plastics they can nevertheless be made available, but I advise that those of materially higher nitrogen content be softened and manipulated very carefully and with a plentiful use of liquids, especially those of high dissolving power and lingering efficiency, like ethyl acetate, for example. I would also assist the solvent action by adding amyl acetate to a moderate degree. As for the more liquid compounds, such as those used for cements, dopes and films, the camphor-chloral proportions are to be retained, but the stronger solvents are necessarily increased. The practice with camphor will be the operator's guide, for the liquid menstrua employed with camphor in the common way can also be used with my chloral-camphor solvents. In this case, there will be no special restrictions on the pyroxyline with reference to its content of nitrogen. Any pyroxline usable with camphor will be compatible in these flowable solutions.

In mentioning the pyroxline usually employed in this art it is understood that for the plastic class of compounds it must be soluble with a fair degree of readiness in wood alcohol or camphor-alcohol. Its nitrogen content ranges from about 10.8 to 12 per cent. The lower field is more particularly suitable for roll masses which are solidified by pressing and then planed into sheets or stuffed into rods, etc. The higher field represents the pyroxyline generally employed for more or less liquid solutions. In other words pyroxyline at about 11% nitrogen is for the usual plastics, and that of about 12% is for lacquers, etc.

I claim:—

1. A plastic composition containing substantially 100 parts pyroxyline, 5 to 10 of camphor and 15 to 30 of a chloral.

2. The process of making pyroxyline plastics which consists of converting 100 parts pyroxyline by the aid of substantially 5 to 10 of camphor and 15 to 30 of a chloral.

3. A plastic composition containing substantially 100 parts pyroxyline, 5 to 10 of camphor and 15 to 30 of chloral alcoholate.

4. The process of making pyroxyline plastics which consists of converting 100 parts pyroxyline by the aid of substantially 5 to 10 of camphor and 15 to 30 of chloral alcoholate.

5. A plastic composition containing 100 parts pyroxyline, substantially 5 to 10 parts of camphor, 15 to 30 parts of a chloral ethyl acetate and amyl acetate.

6. The process of making pyroxyline plastics which consists of converting 100 parts pyroxyline by the aid of ethyl acetate and amyl acetate along with substantially 5 to 10 of camphor and 15 to 30 of a chloral, as described.

7. A plastic composition containing pyroxyline, a chloral, sufficient camphor to impart solvent power, and amyl acetate.

8. A pyroxyline plastic containing to each 100 parts pyroxyline having a nitrogen content of 10.2 to 10.7 per cent substantially 5 to 10 of camphor and 15 to 30 of a chloral.

9. The process of making pyroxyline plastics which consists of converting 100 parts of pyroxyline having a nitrogen content of 10.2 to 10.7 by the aid of substantially 5 to 10 of camphor and 15 to 30 of a chloral.

10. A pyroxyline plastic containing to each 100 parts pyroxyline having a nitrogen content of 10.2 to 10.7 per cent substantially 5 to 10 of camphor and 15 to 30 of chloral alcoholate.

11. The process of making pyroxyline plastics which consists of converting 100 parts of pyroxyline having a nitrogen content of 10.2 to 10.7 per cent by the aid of substantially 5 to 10 of camphor and 15 to 30 of chloral alcoholate.

12. A pyroxyline solution containing 100 parts pyroxyline and substantially 5 to 10 of camphor and 15 to 30 of a chloral along with liquid solvents, as described.

13. A pyroxyline solution containing 100 parts pyroxyline and substantially 5 to 10 of camphor and 15 to 30 of chloral alcoholate, along with liquid solvents, as described.

14. The process of making pyroxyline plastics which consists of converting 100 parts pyroxyline by the aid of amyl acetate along with substantially 5 to 10 parts of camphor and 15 to 20 parts of a chloral, as described.

15. A plastic composition containing pyroxyline substantially 5 to 10 parts of camphor and 15 to 30 parts of chloral alcoholate and amyl acetate.

16. The process of making pyroxyline plastics which consists in converting 100 parts of pyroxyline by the aid of amyl acetate along with substantially 5 to 10 parts of camphor and 15 to 30 parts of chloral alcoholate.

17. A plastic composition containing 100 parts of pyroxyline having a nitrogen content of 10.2 to 10.7 per cent, substantially 5 to 10 parts of camphor, 15 to 30 parts of a chloral, and amyl acetate.

18. A plastic composition containing 100 parts of pyroxyline having a nitrogen content of 10.2 to 10.7 per cent, substantially 5 to 10 parts of camphor, 15 to 30 parts of a chloral, pure ethyl acetate and amyl acetate.

19. The process of making pyroxyline plastics which consists in converting 100 parts of pyroxyline having a nitrogen content of 10.2 to 10.7 per cent by the aid of amyl acetate along with substantially 5 to 10 parts of camphor and 15 to 30 parts of a chloral.

20. The process of making pyroxyline plastics which consists of converting 100 parts of pyroxyline having a nitrogen content of 10.2 to 10.7 per cent by the aid of amyl acetate along with substantially 5 to 10 parts of camphor and 15 to 20 parts of chloral alcoholate.

21. A pyroxyline composition containing approximately 100 parts pyroxyline, 5 to 10 parts camphor, 15 to 30 parts of a chloral and 10 parts amyl acetate.

JOHN H. STEVENS.